(12) United States Patent
Kamezaki et al.

(10) Patent No.: US 11,941,314 B2
(45) Date of Patent: Mar. 26, 2024

(54) DISPLAY CONTROL DEVICE AND DISPLAY CONTROL METHOD

(71) Applicant: TOYOTA JIDOSHA KABUSHIKI KAISHA, Toyota (JP)

(72) Inventors: Yasuyuki Kamezaki, Toyota (JP); Shuhei Manabe, Toyota (JP); Takaaki Nagatani, Okazaki (JP); Masato Endo, Nagoya (JP); Kenya Takagi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 17/689,405

(22) Filed: Mar. 8, 2022

(65) Prior Publication Data
US 2022/0291888 A1 Sep. 15, 2022

(30) Foreign Application Priority Data
Mar. 10, 2021 (JP) .................................. 2021-038775

(51) Int. Cl.
*G06F 3/14* (2006.01)
*G06T 11/00* (2006.01)

(52) U.S. Cl.
CPC .............. *G06F 3/14* (2013.01); *G06T 11/001* (2013.01)

(58) Field of Classification Search
CPC ... G06F 3/14; B60K 2370/1868; B60W 40/08
See application file for complete search history.

(56) References Cited

U.S. PATENT DOCUMENTS

| 9,349,228 B2 * | 5/2016 | Ochsendorf | .......... B60W 40/09 |
| 2019/0126932 A1 * | 5/2019 | Nishimura | ............ B60W 40/04 |

FOREIGN PATENT DOCUMENTS

| JP | 2014-044585 A | 3/2014 |
| JP | 2014-137625 A | 7/2014 |

* cited by examiner

*Primary Examiner* — Samantha (Yuehan) Wang
(74) *Attorney, Agent, or Firm* — Dinsmore & Shohl LLP

(57) ABSTRACT

A display control device includes one or more processors configured to: acquire information regarding a plurality of driving evaluation items set in advance; count, as the number of times of measurement, the number of times that at least one of a vehicle state and a driving state meets each of the driving evaluation items while a driver is driving a vehicle; display the driving evaluation items in a display region in a vehicle cabin; and visually display information relating to the remaining number of times that is a difference between the permissible number of times set for each of the driving evaluation items and the number of times of measurement.

9 Claims, 6 Drawing Sheets

DISPLAY CONTROL DEVICE AND DISPLAY CONTROL METHOD

CROSS-REFERENCE TO RELATED APPLICATION

This application claims priority to Japanese Patent Application No. 2021-038775 filed on Mar. 10, 2021, incorporated herein by reference in its entirety.

BACKGROUND

1. Technical Field

The disclosure relates to a display control device and a display control method.

2. Description of Related Art

Japanese Unexamined Patent Application Publication No. 2014-137625 (JP 2014-137625 A) discloses an acceleration sensing device that evaluates driving skill based on acceleration measured by an acceleration sensor. In the device described in JP 2014-137625 A, acceleration while a vehicle is traveling is displayed as a pie chart on a display unit.

SUMMARY

However, in the above JP 2014-137625 A, evaluation results cannot be comprehended by a driver simply glancing at the display unit. Accordingly, there is room for improvement in effectively conveying driving evaluation results to the driver.

The present disclosure provides a display control device and a display control method capable of effectively conveying driving evaluation results to the driver.

A display control device according to a first aspect of the disclosure includes one or more processors configured to: acquire information regarding a plurality of driving evaluation items set in advance; count, as the number of times of measurement, the number of times that at least one of a vehicle state and a driving state meets each of the driving evaluation items while a driver is driving a vehicle; display the driving evaluation items in a display region in a vehicle cabin; and visually display information relating to the remaining number of times that is a difference between the permissible number of times set for each of the driving evaluation items and the number of times of measurement.

A display control method according to a second aspect of the present application is executed by one or more processors. The display control method includes: setting the permissible number of times for each of a plurality of driving evaluation items set in advance; counting, as the number of times of measurement, the number of times that at least one of a vehicle state and a driving state meets each of the driving evaluation items while a driver is driving a vehicle; displaying the driving evaluation items in a display region in a vehicle cabin; and visually displaying information relating to the remaining number of times that is a difference between the permissible number of times and the number of times of measurement.

As described above, the display control device and the display control method according to the disclosure can effectively convey the driving evaluation results to the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A display control device 10 according to an embodiment will be described with reference to the drawings.

The display control device 10 according to the present embodiment is installed in a vehicle. Also, the display control device 10 is configured to be capable of communicating with a server (not shown) that is owned by a management company, and driving diagnosis data is exchanged between the vehicle and the server.

In the present embodiment, as an example, the display control device 10 is installed in a plurality of vehicles owned by a taxi company, a bus company, or the like. The display control device 10 is a device for prompting a driver to improve driving behavior, by displaying a predetermined display in accordance with driving evaluation results of the vehicle.

Hardware Configuration of Display Control Device 10

Figure 1:
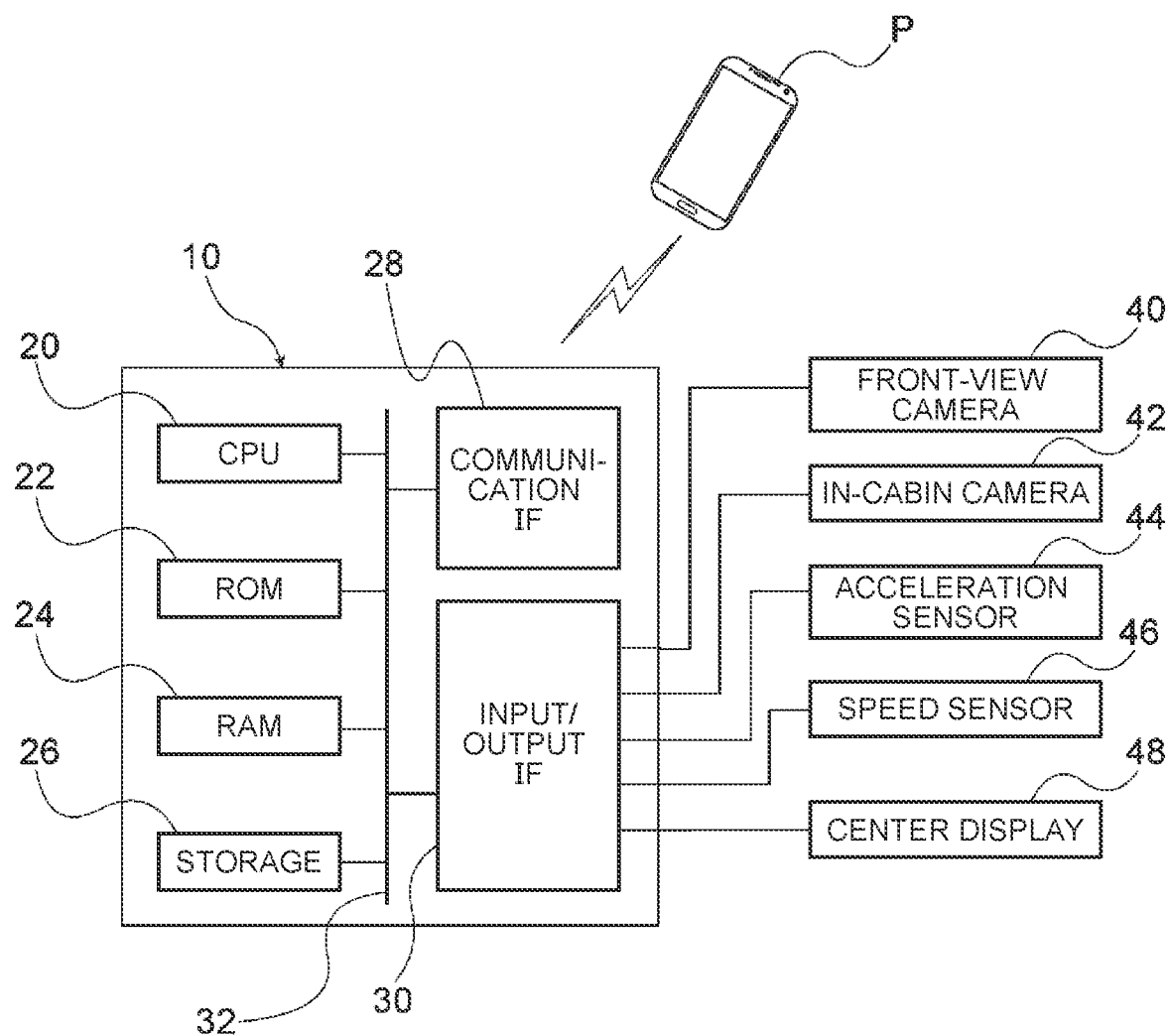
FIG. 1 is a block diagram illustrating a hardware configuration of a display control device according to an embodiment.

FIG. 1 is a block diagram illustrating a hardware configuration of the display control device 10. As illustrated in FIG. 1, the display control device 10 includes a central processing unit (CPU) 20, i.e., a processor, a read-only memory (ROM) 22, a random-access memory (RAM) 24, a storage 26, a communication interface (IF) 28, and an input/output interface (IF) 30. The configurations are connected to each other via a bus 32 so as to be able to communicate with each other.

The CPU 20 is a central processing unit that executes various types of programs and controls various units. That is to say, the CPU 20 reads programs from the ROM 22 or the storage 26, and executes the programs using the RAM 24 as a work region. The CPU 20 performs control of each of the above configurations and various types of computation processing in accordance with the programs recorded in the ROM 22 or the storage 26.

The ROM 22 stores various types of programs and various types of data. The RAM 24 temporarily stores programs and data, serving as a work region. The storage 26 is composed of a hard disk drive (HDD) or a solid state drive (SSD), and stores various types of programs including an operating system, and various types of data. In the present embodiment, the ROM 22 or the storage 26 stores a program for performing display control processing, various types of data, and so forth.

The communication IF 28 is an interface for the display control device 10 to communicate with a device such as a server (not shown). Examples of standards used thereby include Controller Area Network (CAN), Ethernet (registered trademark), Long-Term Evolution (LTE), Fiber Distributed Data Interface (FDDI), Wi-Fi (registered trademark), and so forth. Further, the communication IF 28 is configured to be capable of communicating with a mobile terminal P possessed by the driver, and a display screen of the mobile terminal P is an example of a display region according to the disclosure.

A front-view camera 40, an in-cabin camera 42, an acceleration sensor 44, a speed sensor 46, and a center display 48 as an example of a display region are electrically connected to the input/output IF 30.

The front-view camera 40 is provided at the front of the vehicle and captures images ahead of the vehicle. The images captured by the front-view camera 40 are used, for example, for recognition of a distance between the vehicle and a vehicle traveling ahead, traffic lanes, traffic lights, and so forth.

The in-cabin camera 42 is provided in a vehicle cabin of the vehicle, and is aimed toward the driver. Images captured by the in-cabin camera 42 are used for sensing the line of sight of the driver, for example.

The acceleration sensor 44 detects acceleration of the vehicle. The speed sensor 46 detects the speed of the vehicle. Acceleration data sensed by the acceleration sensor 44 is used to determine whether the vehicle is suddenly accelerating or decelerating, for example. Further, vehicle speed data sensed by the speed sensor 46 is used to determine speeding, for example.

The center display 48 is provided at a position visible to the driver in the front portion of the vehicle cabin, and various types of information is displayed. For example, the center display 48 displays driving evaluation items, which will be described later.

Functional Configuration of Display Control Device 10

The display control device 10 realizes various types of functions using the above hardware resources. A functional configuration realized by the display control device 10 will be described with reference to FIG. 2.

Figure 2:
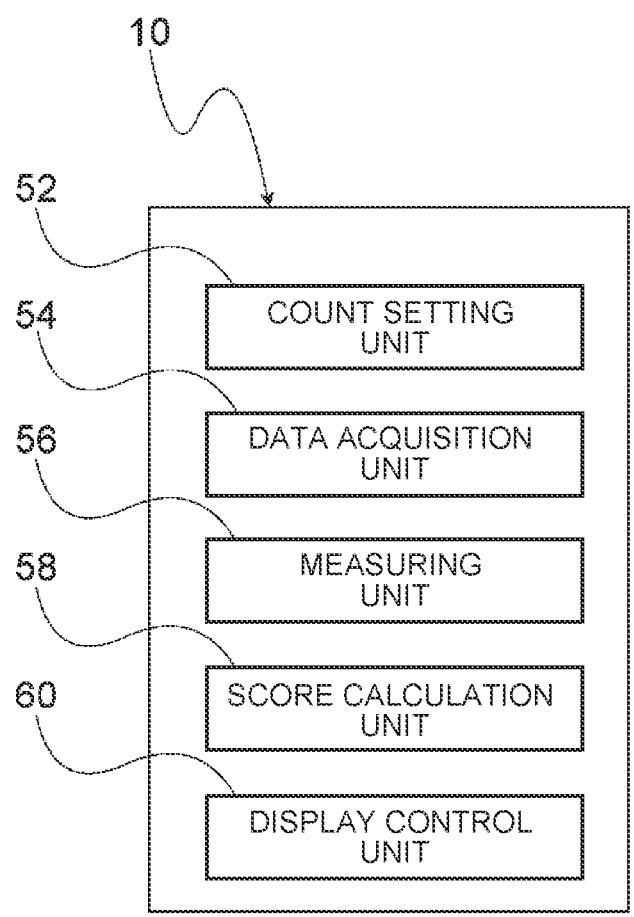
FIG. 2 is a block diagram illustrating a functional configuration of the display control device according to the embodiment.

As illustrated in FIG. 2, the display control device 10 includes a count setting unit 52, a data acquisition unit 54, a measuring unit 56, a score calculation unit 58, and a display control unit 60, as functional configurations. Note that each functional configuration is realized by the CPU 20 reading and executing programs stored in the ROM 22 or the storage 26.

Figure 4:
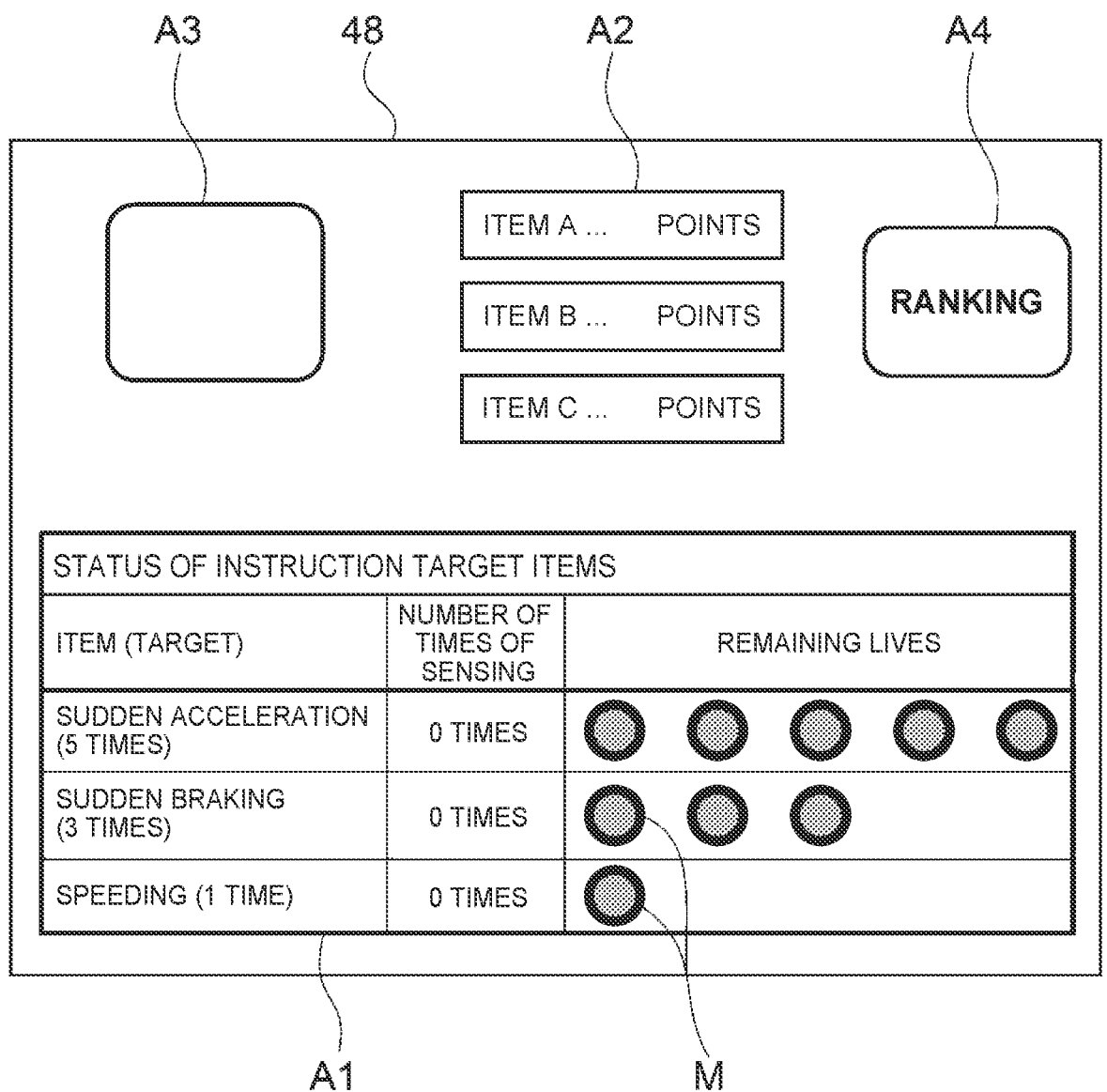
FIG. 4 is a diagram illustrating an example of a display region, and is a diagram illustrating a state before traveling.

The count setting unit 52 sets the permissible number of times for each of a plurality of driving evaluation items set in advance. FIG. 4 illustrates a display example of the center display 48. As illustrated in FIG. 4, in this embodiment, three items that are sudden acceleration, sudden braking, and speeding are set as driving evaluation items, as one example. The driving evaluation items are displayed in a display area A1 set at the lower part of the center display 48.

Sudden acceleration and sudden braking are determined based on signals from the acceleration sensor 44. For example, when acceleration of a predetermined value or more is sensed by the acceleration sensor 44, this is counted as the driving evaluation item of sudden acceleration.

Speeding is determined based on signals from the speed sensor 46. For example, when speed of a predetermined value or more is sensed by the speed sensor 46, this is counted as the driving evaluation item of speeding. Also, a speed limit of a road on which the vehicle is traveling may be acquired, and a threshold value for determining speeding may be changed in accordance with the speed limit.

Here, as illustrated in the display area A1 of FIG. 4, the permissible number of times for each driving evaluation item is displayed as the target number of times. For example, the permissible number of times of sudden acceleration is set to five times, and the permissible number of times of sudden braking is set to three times. Also, the permissible number of times of speeding is set to one time. These permissible number of times are set by the count setting unit 52. Also, the count setting unit 52 has a function of changing the permissible number of times.

In addition, swerving, lane departure (drifting), distracted driving, tailgating, and so forth, may be set as driving evaluation items. For example, swerving is determined based on signals from a steering angle sensor (not shown). Also, lane departure (drifting) is determined based on a position of the vehicle with regard to images ahead of the vehicle, the images being captured by the front-view camera 40.

Distracted driving is determined based on the line of sight of the driver that is sensed by the in-cabin camera 42. Further, tailgating is determined by sensing a distance from the vehicle to a vehicle traveling ahead, based on signals from a sensor such as a radar (not shown). The number of these driving evaluation items may be counted without being displayed on the center display 48.

The data acquisition unit 54 illustrated in FIG. 2 acquires information regarding the driving evaluation items. Specifically, the data acquisition unit 54 acquires vehicle information regarding the vehicle state and driving information regarding the driving state of the driver. For example, the data acquisition unit 54 acquires, as vehicle information, the acceleration and the vehicle speed of the vehicle sensed by the acceleration sensor 44 and the speed sensor 46. Also, the data acquisition unit 54 acquires, as driving information, the distance from the vehicle to the vehicle traveling ahead based on images captured by the front-view camera 40, the traveling position with respect to the lane, and so forth. Further, the data acquisition unit 54 acquires, as driving information, the line of sight of the driver from the images of the driver captured by the in-cabin camera 42.

Based on the acquired vehicle information and the driving information, the measuring unit 56 counts, as the number of times of measurement, the number of times that the vehicle state and/or the driving state of the driver meets each of the driving evaluation items. In the display example illustrated in FIG. 4, a column for the number of times of sensing is set in a portion adjacent to the driving evaluation items in the display area A1, and the number of times of measurement for each driving evaluation item measured by the measuring unit 56 is displayed in the column for the number of times of sensing.

The score calculation unit 58 illustrated in FIG. 2 calculates a driving score based on a proportion of the remaining number of times in the driving evaluation items. Calculation of the driving score by the score calculation unit 58 will be described later.

The display control unit 60 displays information such as the driving evaluation items on at least one of the center display 48 and the mobile terminal P, which are display regions. An example of display items displayed on the center display 48 by the display control unit 60 will be described with reference to FIG. 4.

As illustrated in FIG. 4, the display area A1 is set at the lower part of the center display 48. On the left side of the display area A1, a list of the driving evaluation items and the permissible number of times for each driving evaluation item are displayed. In this embodiment, the three driving evaluation items of sudden acceleration, sudden braking, and speeding, are displayed, as described above.

To the right of the driving evaluation items in the display area A1, the number of times of measurement is displayed as the number of times of sensing. FIG. 4 is a display example before traveling, and accordingly the number of times of measurement is displayed as zero times.

To the right of the column for the number of times of sensing, remaining lives are displayed as symbols M. The remaining lives here mean the proportion of the remaining number of times that is a difference between the permissible number of times set for each driving evaluation item and the number of times of measurement. In the present embodiment, the display control unit 60 displays the same number of symbols M as the remaining number of times, as one example. In the item of sudden acceleration, the permissible number of times is five times and the number of times of measurement is zero times, and accordingly five symbols M are displayed in a column for the remaining lives. Thus, these five symbols M match the remaining number of times.

In the item of sudden braking, the permissible number of times is three times and the number of times of measurement is zero times, and accordingly three symbols M are displayed in the column for the remaining lives. Thus, these three symbols M match the remaining number of times. Also, in the item of speeding, the permissible number of times is one time and the number of times of measurement is zero times, and accordingly one symbol M is displayed in the column for the remaining lives. Thus, this one symbol M matches the remaining number of times.

Figure 5:
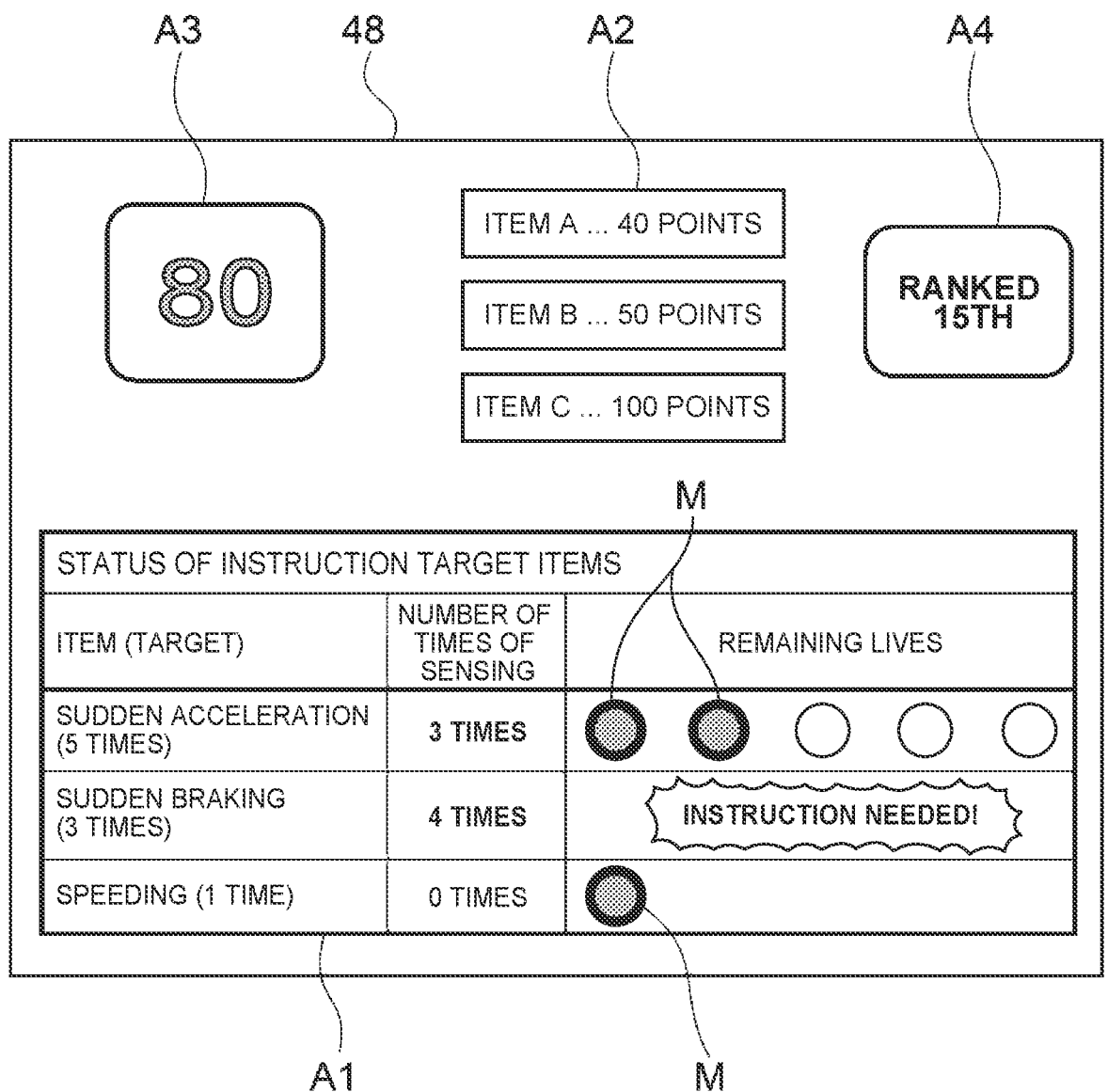
FIG. 5 is a diagram illustrating an example of the display region, and is a diagram illustrating a state while traveling.

On the other hand, as illustrated in FIG. 5, when sudden acceleration is measured three times while traveling, two symbols M are displayed in the column for the remaining lives, and these two symbols M match the remaining number of times. Further, when sudden braking is measured four times while traveling, the number of times of measurement exceeds the permissible number of times, and accordingly the symbol M is not displayed in the column for the remaining lives. In the column for the remaining lives corresponding to the item of sudden braking, the text "Instruction needed!" that indicates that instruction is necessary is displayed highlighted. That is to say, the display control unit 60 makes a highlighted display of the display portion of the driving evaluation item in which the number of times of measurement is equal to or greater than the permissible number of times.

Also, the display control unit 60 of the present embodiment makes a highlighted display of the display portion of the driving evaluation item in which the proportion of the remaining number of times is equal to or less than a predetermined value. For example, the display control unit 60 makes a highlighted display of the item of sudden acceleration when the remaining number of times reaches half or less of the permissible number of times. Specifically, as shown in FIG. 5, the display portion of the number of times of measurement in the item of sudden acceleration is displayed in bold text. Also, the display control unit 60 may make a highlighted display by changing the color of the item indicating the number of times of sensing.

Display areas A2, A3, and A4 are set in the upper part of the center display 48. In the display area A2, the driving scores of item A, item B, and item C, are displayed. An item that serves as an indicator for evaluating driving is displayed in each of item A, item B, and item C. For example, an item indicating the level of safe driving, an item indicating the level of fuel-conserving driving, an item indicating the comfort level of occupants, or the like, may be employed for item A, item B, and item C.

Scores calculated by the score calculation unit 58 are displayed as the driving scores for item A, item B, and item C. Specifically, the score calculation unit 58 calculates the driving scores of item A, item B, and item C, based on the number of times of measurement of each driving evaluation item. The display control unit 60 then displays, in the display area A2, the driving scores of item A, item B, and item C that have been calculated by the score calculation unit 58.

As an example, when the item A is an item indicating the level of safe driving, the score calculation unit 58 acquires the remaining number of times of evaluation items related to safe driving, out of the driving evaluation items. The score calculation unit 58 then calculates a deduction score for each driving evaluation item by multiplying each number of times of measurement by a predetermined coefficient, and obtains the score of item A by subtracting the deduction score from a maximum score of 100. Also, the score calculation unit 58 may significantly lower the driving score when there is a driving evaluation item in which the number of times of measurement is equal to or greater than the permissible number of times. Note that in the present embodiment, the driving score is not displayed in the state before traveling, as illustrated in FIG. 4.

The display area A3 is set on the left side of the display area A2, and the total driving score is displayed in this display area A3. The total driving score is calculated by the score calculation unit 58. For example, the score calculation unit 58 may calculate the total driving score based on the driving scores of each of item A, item B, and item C. Also, the score calculation unit 58 may calculate the total driving score based on the number of times of measurements of all the driving evaluation items. In the present embodiment, as one example, the maximum score for the total score is set to 100, and the total score decreases as the number of times of measurement of each driving evaluation item increases. The display control unit 60 then displays the total score calculated by the score calculation unit 58 in the display area A3.

On the other hand, the display area A4 is set on the right side of the display area A2, and a driver ranking is displayed in the display area A4. For example, the total scores of drivers belonging to companies such as taxi companies and bus companies are stored in a server, the total score is sorted in descending order, and rankings are set in order from the driver with the highest total score. The display control unit 60 then displays, in the display area A4, the driver ranking that has been acquired from the server by the data acquisition unit 54. The ranking displayed in the display area A4 is updated at predetermined intervals of time.

Operations

Next, operations of the present embodiment will be described.

Example of Display Control Processing

Figure 3:
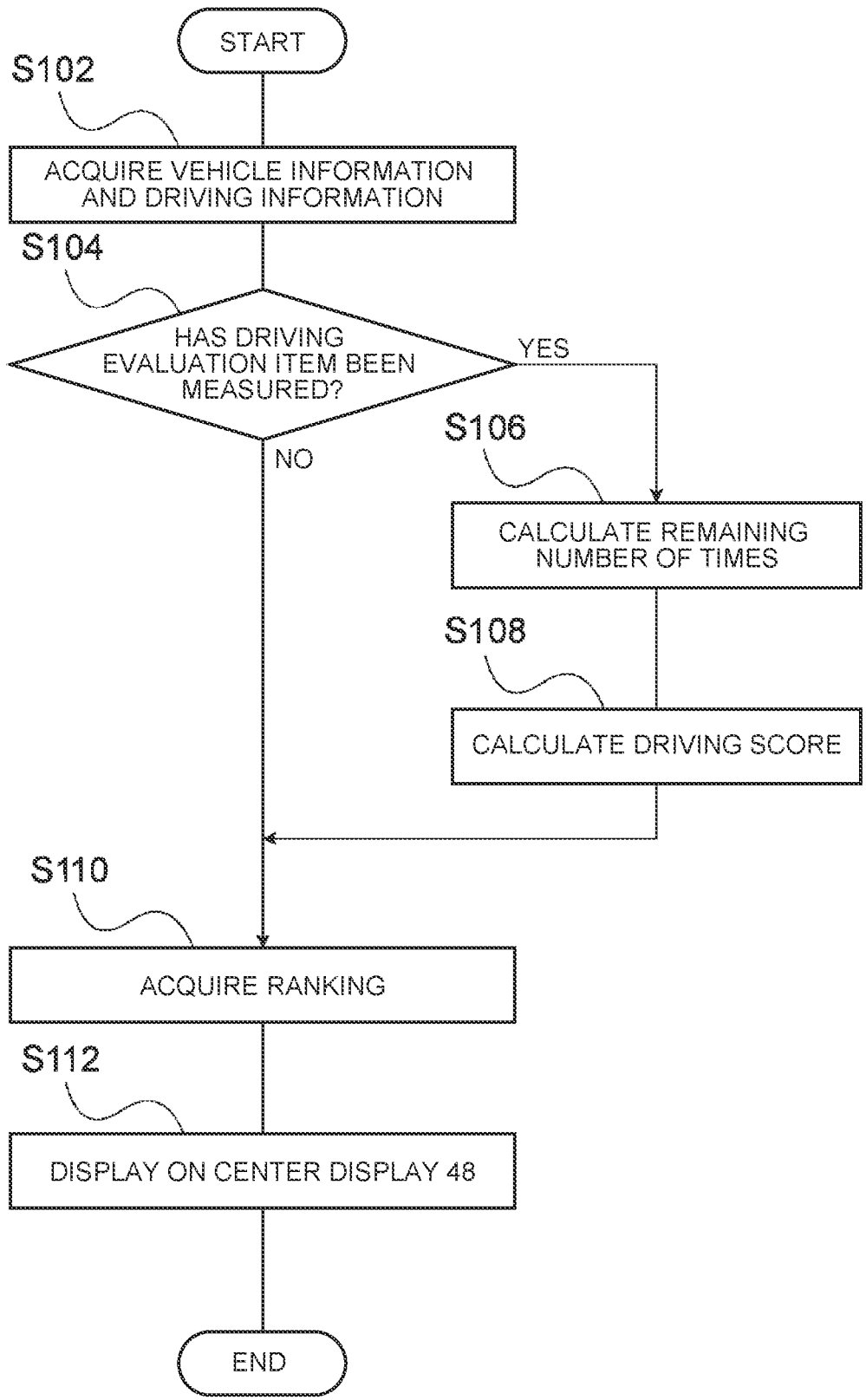
FIG. 3 is a flowchart showing an example of a flow of display control processing in the embodiment.

FIG. 3 is a flowchart showing an example of the flow of driving diagnosis processing by the display control device 10. This driving diagnosis processing is executed by the CPU 20 reading programs from the ROM 22 or the storage 26 and loading the programs to the RAM 24.

As shown in FIG. 3, the CPU 20 acquires vehicle information and driving information in step S102. Specifically, the CPU 20 acquires vehicle information and driving information from the sensors by the functions of the data acquisition unit 54.

In step S104, the CPU 20 determines whether the driving evaluation item has been measured. Specifically, when the vehicle information and the driving information acquired by the data acquisition unit 54 correspond to one of the driving evaluation items, the CPU 20 determines that the driving evaluation item has been measured, and proceeds to the processing of step S106. On the other hand, when determination is made that no driving evaluation item has been measured, the CPU 20 proceeds to the processing of step S110.

The CPU 20 calculates the remaining number of times in step S106. Specifically, the CPU 20 counts the number of times of measurement corresponding to the driving evaluation item by the function of the measuring unit 56, and calculates the remaining number of times that is a difference between the permissible number of times and the number of times of measurement.

Subsequently, the CPU 20 calculates the driving score in step S108. Specifically, the CPU 20 calculates the driving score by the function of the score calculation unit 58 based on the remaining number of times of each driving evaluation item calculated in step S106. In the present embodiment, as one example, the score calculation unit 58 calculates item A, item B, item C, and the total driving score. The CPU 20 then transitions to the processing of step S110.

The CPU 20 acquires the ranking in step S110. Specifically, as described above, the server stores the total score of each driver, and the ranking is set in the order of the total scores. The CPU 20 then acquires the ranking of the driver that is stored in the server. Even though the total score of the driver of this vehicle does not change, the ranking will change due to change in the total scores of other drivers.

The CPU 20 displays information on the center display 48 in step S112. Specifically, the CPU 20 displays the driving evaluation item, the permissible number of times, and the number of times of measurement, in the display area A1 of the center display 48, by the functions of the display control unit 60. Further, the CPU 20 visually displays the proportion of the remaining number of times in the display area A1, by the functions of the display control unit 60. At this time, the display control unit 60 makes a highlighted display of the display portion of the driving evaluation item in which the number of times of measurement is equal to or greater than the permissible number of times, and the display portion of the driving evaluation item in which the proportion of the remaining number of times is equal to or less than a predetermined value.

Further, in step S112, the CPU 20 displays the driving score in the display area A2 and the display area A3, and also displays the ranking in the display area A4, by the functions of the display control unit 60. The CPU 20 then ends the display control processing.

As described above, in the display control device 10 of the present embodiment, the driving evaluation items are displayed by the display control unit 60 on the center display 48 that is a display region in the vehicle cabin. Thus, the driver can comprehend the driving evaluation items simply by viewing the center display 48.

Also, as illustrated in FIG. 5, the display control unit 60 visually displays, on the center display 48, the proportion of the remaining number of times that is a difference between the permissible number of times and the number of times of measurement. Thus, the driver can comprehend the remaining number of times until reaching the permissible number of times, simply by glancing at the center display 48. As described above, the display control device 10 according to the present embodiment can effectively convey the driving evaluation results to the driver.

In particular, in the present embodiment, the remaining number of times is displayed in the display area A1 by the number of symbols M. Thus, the driver can instantly comprehend the remaining number of times, and thus can be suppressed from misreading the remaining number of times.

Further, in the present embodiment, the display portion of the driving evaluation item in which the proportion of the remaining number of times is equal to or less than the predetermined value is displayed highlighted. As a result, the driver can comprehend the item approaching the permissible number of times without viewing the remaining number of times.

Further, in the present embodiment, the display portion of the driving evaluation item in which the number of times of measurement is equal to or greater than the permissible number of times is displayed highlighted. Specifically, the display control unit 60 displays the text "Instruction needed!". Thus, the driver can comprehend that the permissible number of times has been reached, without viewing the remaining number of times.

Furthermore, in the present embodiment, the display control unit 60 displays the driving score in the display area A2 and the display area A3. Thus, the driver can tell the driving evaluation results simply by viewing the driving score, without confirming the individual driving evaluation items. When the driving score is low, the cause of the low driving score can be comprehended by viewing the remaining number of times of the driving evaluation item.

Figure 6:
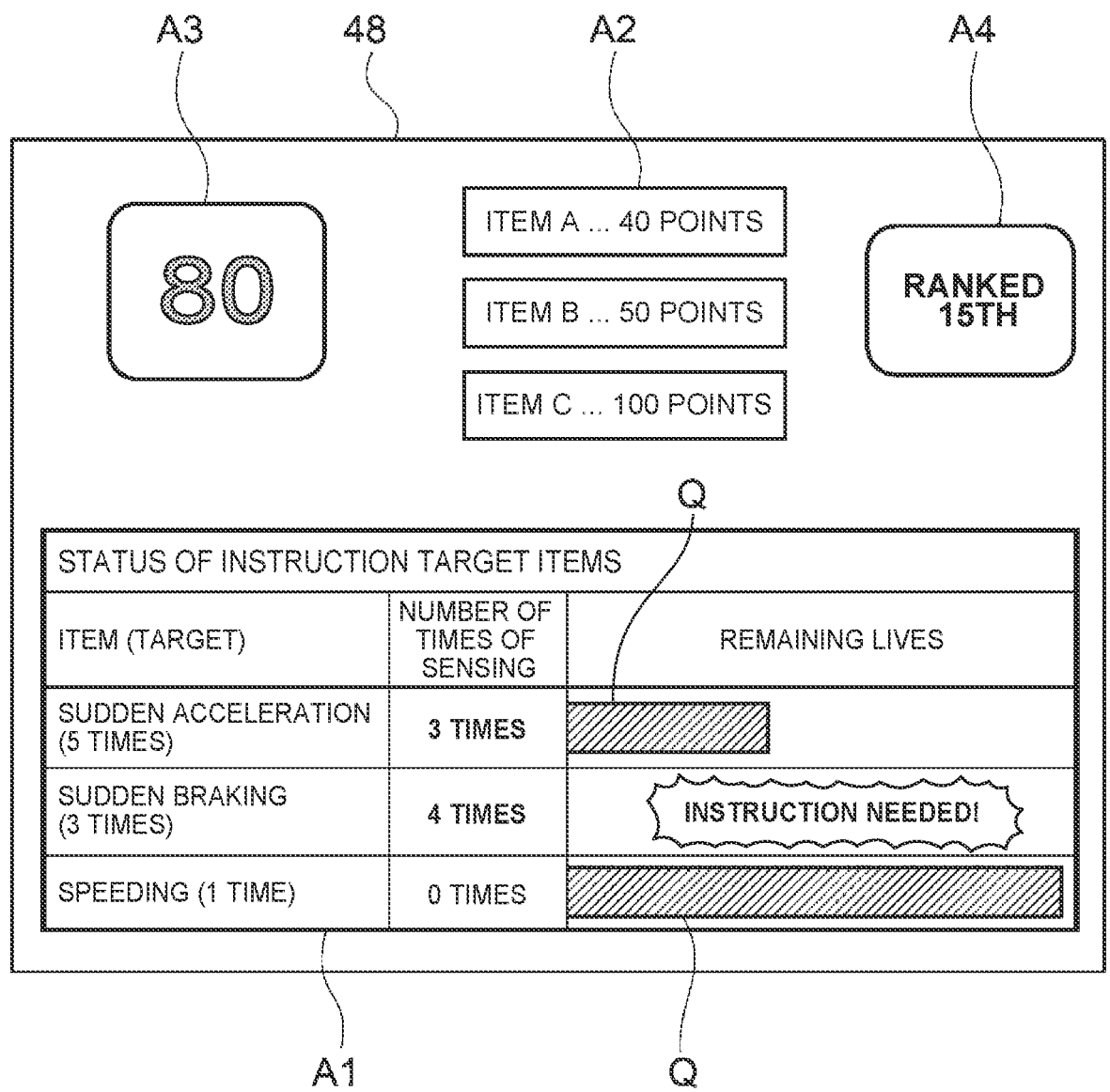
FIG. 6 is a diagram illustrating another example of the display region.

Although the display examples in FIGS. 4 and 5 have been described in the present embodiment, the display example illustrated in FIG. 6 may be employed as another display example.

Other Display Example

As illustrated in FIG. 6, in another display example, the display mode of the remaining number of times in the display area A1 is changed. Specifically, the remaining lives are displayed by a bar-shaped symbol Q to the right of the column for the number of times of sensing. The remaining lives here mean the proportion of the remaining number of times that is a difference between the permissible number of times set for each driving evaluation item and the number of times of measurement.

In the present embodiment, as one example, the display control unit 60 displays the proportion of the remaining number of times to the permissible number of times by the symbol Q. Further, the display control unit 60 displays the symbol Q so that the length thereof becomes shorter as the proportion of the remaining number of times decreases.

For example, in FIG. 6, the number of times of measurement of the item of speeding is zero times, the proportion of the remaining number of times to the permissible number of times is 100%. Accordingly, the symbol Q of the speeding item extends from the left end to the right end of the display portion, and the length of this symbol Q corresponds to the proportion of 100%. On the other hand, in the item of sudden acceleration, the number of times of measurement is three, and accordingly the proportion of the remaining number of times to the permissible number of times is 40%. Accordingly, the symbol Q of the item of sudden acceleration is displayed with a length of less than half of that of the symbol Q of speeding.

As described above, in the other display examples, the proportion of the remaining number of times to the permissible number of times is displayed by the length of the symbol Q, which is effective when displaying an item having the large permissible number of times and the large number of times of measurement.

Although the display control device 10 according to the embodiment has been described above, it goes without saying that implementation thereof can be carried out in various modes without departing from the essence of the disclosure. For example, in the above embodiment, the number of symbols M match the remaining number of times as illustrated in FIG. 5, but the disclosure is not limited to this. As another example, the display control unit 60 may change the color of the symbols M by the same number of symbols M as the remaining number of times. Specifically, in the item of sudden acceleration in FIG. 5, symbols having the same shapes as the two symbols M may be displayed in different colors to the right of the symbols M. The driver can comprehend the remaining number of times at a glance in this case as well.

Also, the display control unit 60 may display the proportion of the remaining number of times with a symbol different from the symbol M in FIG. 5 and the symbol Q in FIG. 6. For example, instead of the symbol M, a symbol having the shape of a predetermined cartoon character may be used. A symbol of which the color changes in accordance with the proportion of the remaining number of times may be used. In this case, a green symbol may be displayed when the remaining number of times is large, and the symbol may be gradually changed to red as the remaining number of times decreases.

Further, in the above embodiment, the number of times of measurement is displayed as the number of times of sensing, but the embodiment is not limited to this. For example, the number of times of measurement may be hidden. In this case as well, the driver can intuitively comprehend the remaining number of times by viewing the symbols M and the symbols Q.

Moreover, in the above embodiment, three driving evaluation items are displayed in the display area A1, but even more driving evaluation items may be displayed.

Also, in the above embodiment, the driving score is displayed in the display area A2 and the display area A3, but the embodiment is not limited to this, and the driving score may be hidden. Also, the driving score may be displayed by the driver switching the screen. Further, although the ranking is displayed in the display area A4, the embodiment is not limited to this, and the ranking may be hidden, or the ranking may be displayed by the driver switching the screen.

Further, in the above embodiment, the number of times of measurement of the driving evaluation item in which the proportion of the remaining number of times is equal to or less than a predetermined value is displayed in bold text, but the embodiment is not limited to this, and highlighting of display may be performed by another method. For example, the color of the column for the corresponding driving evaluation item may be changed. Further, the symbol M may be displayed blinking for the driving evaluation item in which the proportion of the remaining number of times is equal to or less than a predetermined value.

Moreover, an example of displaying on the center display 48 has been illustrated and described in the above embodiment, but the embodiment is not limited to this, and the driving evaluation items and so forth may be displayed on the mobile terminal P of the driver.

Further, various types of processors other than the CPU 20 may execute the display processing in which the CPU 20 reads and executes the program in the above embodiment. Examples of processors in this case include programmable logic devices (PLD) such as field-programmable gate array (FPGA) in which the circuit configuration can be changed after manufacturing, dedicated electric circuits that are processors having a circuit configuration designed specifically to execute particular processing, such as application specific integrated circuit (ASIC), and so forth. Also, the display control processing may be executed by one of these various types of processors, or may be executed by a combination of two or more processors of the same type or different types, such as, for example, a plurality of FPGAs, a combination of a CPU and an FPGA, and so forth. Further, the hardware structure of these various processors is, more specifically, an electric circuit in which circuit elements such as semiconductor elements are combined.

Further, in the above embodiment, the storage 26 is configured to store various types of data, but the present disclosure is not limited to this. For example, a non-transitory recording medium, such as a compact disc (CD), a digital versatile disc (DVD), Universal Serial Bus (USB) memory, or the like, may be used as a storage unit. In this case, various types of programs, data, and the like are stored in these recording media.

A display control device according to a first aspect of the disclosure includes one or more processors configured to: acquire information regarding a plurality of driving evaluation items set in advance; count, as the number of times of measurement, the number of times that at least one of a vehicle state and a driving state meets each of the driving evaluation items while a driver is driving a vehicle; display the driving evaluation items in a display region in a vehicle cabin; and visually display information relating to the remaining number of times that is a difference between the permissible number of times set for each of the driving evaluation items and the number of times of measurement.

With the above aspect, the driver can comprehend the driving evaluation items simply by viewing the display region. Also, the driver can comprehend the remaining number of times until reaching the permissible number of times, simply by glancing at the display region. Note that the "driving evaluation item" here is not limited to items evaluated based on vehicle information such as acceleration and steering angle, but rather is a broad concept including items of evaluating distracted driving, running red lights, and stop sign violation, based on information on line of sight of the driver and external environments. Further, the "display region in the vehicle cabin" is not limited to the display installed in the vehicle cabin, but rather is a concept that broadly includes a mobile terminal located in the vehicle cabin while driving, and so forth.

In the above aspect, the one or more processors may be configured to display, in the display region, the same number of symbols as the remaining number of times, or display, in the display region, the same number of symbols as the permissible number of times, with the same number of symbols as the remaining number of times displayed in a different color.

With the above configuration, the driver can be suppressed from misreading the remaining number of times.

In the above aspect, the one or more processors may be configured to visually display a proportion of the remaining number of times to the permissible number of times. Further, the one or more processors may be configured to make a highlighted display of a display portion of a driving evaluation item in which a proportion of the remaining number of times to the permissible number of times is equal to or less than a predetermined value.

With the above configuration, the driver can comprehend the item approaching the permissible number of times without viewing the remaining number of times.

In the above aspect, the one or more processors may be configured to make a highlighted display of a display portion of a driving evaluation item in which the number of times of measurement has reached the permissible number of times or more.

With the above configuration, the driver can comprehend that the permissible number of times has been reached, without viewing the remaining number of times.

In the above aspect, the one or more processors may be configured to calculate a driving score based on the proportion of the remaining number of times to the permissible number of times in each of the driving evaluation items, and display the driving score in the display region.

With the above configuration, the driver can tell the driving evaluation results simply by viewing the driving score, without confirming the individual driving evaluation items. Also, when the driving score is low, the cause of the low driving score can be comprehended by viewing the remaining number of times of the driving evaluation items.

A display control method according to a second aspect of the present application is executed by one or more processors. The display control method includes: setting the permissible number of times for each of a plurality of driving evaluation items set in advance; counting, as the number of times of measurement, the number of times that at least one of a vehicle state and a driving state meets each of the driving evaluation items while a driver is driving a vehicle; displaying the driving evaluation items in a display region in a vehicle cabin; and visually displaying information relating to the remaining number of times that is a difference between the permissible number of times and the number of times of measurement.

What is claimed is:

1. A display control device comprising one or more processors configured to:
   acquire information regarding a plurality of driving evaluation items set in advance; count, as the number of times of measurement, the number of times that at least one of a vehicle state and a driving state meets each of the driving evaluation items while a driver is driving a vehicle;
   display the driving evaluation items in a display region in a vehicle cabin; and
   visually display information relating to the remaining number of times that is a difference between a permissible number of times set for each of the driving evaluation items and the number of times of measurement, and display information relating to the permissible number of times for each of the driving evaluation items, the plurality of driving evaluation items comprising a sudden acceleration, a sudden braking, and speeding.

2. The display control device according to claim 1, wherein the one or more processors are configured to
   display, in the display region, the same number of symbols as the remaining number of times, or display, in the display region, the same number of symbols as the permissible number of times, with the same number of symbols as the remaining number of times displayed in a different color.

3. The display control device according to claim 1, wherein the one or more processors are configured to visually display a proportion of the remaining number of times to the permissible number of times.

4. The display control device according to claim 1, wherein the one or more processors are configured to make a highlighted display of a display portion of a driving evaluation item in which a proportion of the remaining number of times to the permissible number of times is equal to or less than a predetermined value.

5. The display control device according to claim 1, wherein the one or more processors are configured to make a highlighted display of a display portion of a driving evaluation item in which the number of times of measurement has reached the permissible number of times or more.

6. The display control device according to claim 1, wherein the one or more processors are configured to
   calculate a driving score based on the proportion of the remaining number of times to the permissible number of times in each of the driving evaluation items, and
   display the driving score in the display region.

7. The display control device according to claim 1, wherein the one or more processors are configured to acquire, display, and update a ranking of the driver at predetermined intervals of time and based on a total score.

8. A display control method executed by one or more processors comprising:
   setting a permissible number of times for each of a plurality of driving evaluation items set in advance;
   counting, as the number of times of measurement, the number of times that at least one of a vehicle state and a driving state meets each of the driving evaluation items while a driver is driving a vehicle;
   displaying the driving evaluation items in a display region in a vehicle cabin; and
   visually displaying information relating to the remaining number of times that is a difference between the permissible number of times and the number of times of measurement, and displaying information relating to the permissible number of times for each of the driving evaluation items, the plurality of driving evaluation items comprising a sudden acceleration, a sudden braking, and speeding.

9. The display control method according to claim 8, further comprising: acquiring, displaying, and updating a ranking of the driver at predetermined intervals of time and based on a total score.

* * * * *